United States Patent
Satran et al.

(10) Patent No.: US 9,475,134 B2
(45) Date of Patent: Oct. 25, 2016

(54) CUTTING INSERT AND CUTTING TOOL

(75) Inventors: Amir Satran, Kfar Vradim (IL); Evgeny Tulchinsky, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 993 days.

(21) Appl. No.: 13/465,713

(22) Filed: May 7, 2012

(65) Prior Publication Data

US 2013/0156515 A1 Jun. 20, 2013

Related U.S. Application Data

(60) Provisional application No. 61/577,428, filed on Dec. 19, 2011.

(51) Int. Cl.
*B23C 5/02* (2006.01)
*B23C 5/20* (2006.01)
*B23C 5/22* (2006.01)
*B23C 5/06* (2006.01)

(52) U.S. Cl.
CPC .............. *B23C 5/207* (2013.01); *B23C 5/06* (2013.01); *B23B 2200/3681* (2013.01); *B23C 2200/0422* (2013.01); *B23C 2200/087* (2013.01); *B23C 2200/125* (2013.01); *B23C 2200/283* (2013.01); *B23C 2200/286* (2013.01); *B23C 2200/326* (2013.01); *B23C 2210/168* (2013.01); *Y10T 407/1906* (2015.01); *Y10T 407/1936* (2015.01); *Y10T 407/23* (2015.01)

(58) Field of Classification Search
CPC ............ B23C 2200/283; B23C 2200/286; B23C 5/06; B23C 2200/3681; B23C 2200/0422; B23C 2200/087; B23C 2200/125; B23C 2200/326; B23C 2210/168; B23C 5/207

USPC ............... 407/42, 113–116, 101–104
See application file for complete search history.

(56) References Cited

U.S. PATENT DOCUMENTS

| | | | | |
|---|---|---|---|---|
| 1,838,520 A | * | 12/1931 | Archer | 407/104 |
| 3,142,110 A | * | 7/1964 | Hertel | 407/114 |
| 3,490,117 A | * | 1/1970 | Hertel | 407/104 |
| 3,541,655 A | * | 11/1970 | Stier | 407/113 |
| 4,294,566 A | * | 10/1981 | Boone | 407/114 |
| 4,425,063 A | * | 1/1984 | Striegl | 408/81 |
| 4,531,863 A | * | 7/1985 | Smith | 407/113 |
| 4,531,864 A | * | 7/1985 | Bylund | 407/114 |
| 4,573,831 A | * | 3/1986 | Lacey | 407/42 |
| 4,729,697 A | * | 3/1988 | Lacey | 407/42 |
| 5,957,629 A | | 9/1999 | Hessman et al. | |
| 6,053,671 A | | 4/2000 | Stedt et al. | |

(Continued)

OTHER PUBLICATIONS

International Search Report dated Apr. 12, 2013 issued in PCT counterpart application (No. PCT/IL2012/050467).

*Primary Examiner* — Sara Addisu
(74) *Attorney, Agent, or Firm* — Womble Carlyle (57) ABSTRACT

A cutting insert has polygonal first and second end surfaces which are connected by a peripheral side surface, each end surface defining first and second end planes, respectively. The peripheral side surface has first peripheral side portions alternated in the circumferential direction with second peripheral side portions. The first peripheral side portions are inverse copies of the second peripheral side portions. Each peripheral side portion includes first and second sub-faces which form different angles with the first and second end planes. The first and second sub-faces intersect one another between the first and second end planes to form a line which is parallel to the first and second end planes.

33 Claims, 7 Drawing Sheets

(56) References Cited

U.S. PATENT DOCUMENTS

| | | | |
|---|---|---|---|
| 6,164,878 A * | 12/2000 | Satran et al. | 407/113 |
| 6,935,815 B2 * | 8/2005 | Schwaner et al. | 407/114 |
| 6,966,729 B2 * | 11/2005 | Dehn et al. | 407/113 |
| 7,037,051 B2 | 5/2006 | Wermeister | |
| 7,217,070 B2 * | 5/2007 | Hecht | 408/154 |
| 7,252,460 B2 * | 8/2007 | Rieth | 407/113 |
| 7,357,604 B2 * | 4/2008 | Craig | 407/113 |
| 7,390,149 B2 * | 6/2008 | Wihlborg | 407/35 |
| 7,713,006 B2 * | 5/2010 | MacLennan et al. | 407/113 |
| 8,096,735 B2 * | 1/2012 | Sladek et al. | 407/114 |
| 8,206,066 B2 * | 6/2012 | Men | B23C 5/202 407/113 |
| 8,277,151 B2 * | 10/2012 | Wandeback | 407/42 |
| 8,434,974 B2 * | 5/2013 | Spitzenberger | 407/55 |
| 8,454,278 B2 * | 6/2013 | Hartlohner et al. | 407/113 |
| 8,491,234 B2 * | 7/2013 | Fang et al. | 407/113 |
| 2010/0054873 A1 * | 3/2010 | Men | B23C 5/202 407/42 |
| 2010/0272526 A1 | 10/2010 | Dufour et al. | |

* cited by examiner

CUTTING INSERT AND CUTTING TOOL

RELATED APPLICATIONS

The present application claims priority to U.S. Provisional Patent Application No. 61/577,428, filed 19 Dec. 2011, whose contents are incorporated by reference in their entirety.

FIELD OF THE INVENTION

The present invention relates to a rotary metal cutting tool and an indexable reversible cutting insert, for metal cutting processes in general, and for milling operations in particular.

BACKGROUND OF THE INVENTION

Metal cutting tools used in milling operations, including cutting inserts which are removably secured in a cutting body, have long since provided a suitably hard material, i.e. cemented carbide, in the vicinity of the cutting edge, where the cutting body, manufactured from a less hard material, is reusable following the disposal of a worn or damaged cutting insert.

Cutting inserts are clamped within insert receiving pockets located on the periphery of the tool body, for holding and supporting cutting inserts in both axial and radial directions during operation (e.g., milling operation).

U.S. Pat. No. 3,541,655 issued to Stier, and entitled "Indexable and Reversible Cutting Inserts", is directed to a cutting insert with two parallel identical uneven polygonal end faces. The end faces are rotated with respect to one another. A trapezoidal side face extends between each side of one of the polygonal end faces and a respective side of the other end face. Each two adjacent side faces are formed of two opposite trapezoids. Each trapezoidal side face forms an acute angle with one of the end faces, while forming a complementary obtuse angle with the other end face.

U.S. Pat. No. 7,037,051 issued to Wermeister, and entitled "Cutting Insert for Turning and Milling", is directed to a cutting insert with first and second polygonally-shaped main faces arranged substantially parallel to one another. A side face structure interconnects the first and second main faces to define a peripheral edge. The main faces include projections extending towards the peripheral edge. Each projection is formed by a portion of the first main surface, defining a relief surface; a portion of the side face structure, defining a rake surface; and a portion of the peripheral edge, defining a cutting edge. The cutting insert includes support surfaces defined by a portion of the second main face, and by portions of the side surface structure other than the rake surface.

U.S. Pat. No. 5,957,629 issued to Hessman, and entitled "Fine Milling Cutting Insert", is directed to a double-sided milling cutting insert. The insert includes two parallel main surfaces which are turned 90° relative to each other. Each main surface includes four operative cutting corners. In each cutting corner there are two bevelled surfaces which are angled relative to the plane of the main surface. Further, four side surfaces of the insert are angled extending between the main surfaces.

U.S. Pat. No. 4,294,566 issued to Boone, and entitled "Eight Edge Positive Chip Control Insert", is directed to a cutter insert with eight positive cutting edges and a rectangular prismatic configuration. The insert has a pair of opposed primary faces, and four rectangular side faces each having a pair of coplanar, flat lands in opposite corners thereof, for positive location and clamping of the insert. Each side face also has a laterally opposed pair of positive beveled facets formed therein, and intersecting the respective primary faces in an inward slope to define neutral cutting edges for the insert. An elongated groove extends intermediate the beveled facets of each side face parallel to the neutral cutting edges.

It is an object of the present invention to provide an improved indexable reversible cutting insert and cutting tool therefor, the cutting insert having a plurality of cutting edges, which may be employed in a positive axial rake and a negative radial rake relation to a work piece.

SUMMARY OF THE INVENTION

In accordance with the present invention, there is provided an indexable reversible cutting insert, comprising:
- a first polygonal shaped end surface and a second polygonal shaped end surface, identical and parallel to the first end surface, the second end surface being rotated relative to the first end surface;
- a peripheral side surface extending between the end surfaces, the peripheral side surface including a plurality of peripheral side portions;
- two continuous circumferential cutting edges, each circumferential cutting edge formed along the entire intersection of each end surface with the peripheral side surface, each circumferential cutting edge including a plurality of identical cutting edge sections, each cutting edge section extending between two vertexes of the polygonal shape of the respective end surface, each cutting edge section including a first cutting edge and a second cutting edge;
- a central through bore extending between, and opening out to, the end surfaces; and
- two insert abutment surfaces, each insert abutment surface located on a respective end surface, wherein:
- each of the peripheral side portions includes a first sub-face and a second sub-face non-coplanar to the first sub-face, the first and second sub-faces define at least one intermediate plane located between the end surfaces and parallel to the end surfaces, the first and second sub-faces intersecting in one of the at least one intermediate plane, and
- wherein in each peripheral side portion:
  - each first sub-face extends between a respective one of the first cutting edges and one of the at least one intermediate plane, forming a first insert internal angle with one end plane that is defined by an associated end surface,
  - each second sub-face extends between a respective one of the second cutting edges and one of the at least one intermediate plane, forming a second insert internal angle with another end plane that defined by another end surface, the second insert internal angle being an acute angle, and different from the first insert internal angle.

In accordance with another embodiment of the present invention, there is provided a cutting tool having a longitudinal axis of rotation, the cutting tool comprising:
- a tool body having a front end with at least one insert pocket formed therein; and
- a cutting insert as described above retained in the at least one insert pocket.

In the cutting tool:
- each insert pocket comprises:
  - a pocket abutment surface defining an abutment plane;

a threaded bore opening out to the pocket abutment surface;

two pocket receiving sidewalls extending from the abutment plane, each of the pocket receiving sidewalls including:

a first planar sidewall section forming an insert receiving external angle with a plane which intersects the first planar sidewall section and is parallel to the abutment plane; and a second planar sidewall section intersecting with the respective first planar sidewall section, and extending towards the abutment plane to form an acute pocket external angle therewith, one of the two insert abutment surfaces abuts the pocket abutment surface, the first sub-faces of two peripheral side portions of the cutting insert abut respective ones of the first sidewall sections, in a dovetail manner, and a clamping bolt passes through the central through bore of the cutting insert and threadingly engages the threaded bore of the insert pocket.

In accordance with a further embodiment of the present invention, there is provided a cutting tool body having a longitudinal axis of rotation and a front end with at least one insert pocket formed therein, wherein:

the at least one insert pocket comprises:

a pocket abutment surface defining an abutment plane;

a threaded bore opening out to the pocket abutment surface; and two pocket receiving sidewalls extending from the abutment plane, each of the pocket receiving sidewalls including:

a first planar sidewall section forming an insert receiving external angle with a plane which intersects the first planar sidewall section and is parallel to the abutment plane; and a second planar sidewall section intersecting with the respective first planar sidewall section, and extending towards the abutment plane to form an acute pocket external angle therewith, and in a front view of each insert pocket, the two pocket receiving sidewalls form a substantially right angle therebetween.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

The present invention relates to an indexable reversible cutting insert, having two opposing polygonal shape end surfaces and a peripheral surface extending therebetween. The invention also relates to a cutting tool for employing the cutting inserts in a positive axial rake angle and a negative radial rake angle when engaging a work piece.

Figure 1A:
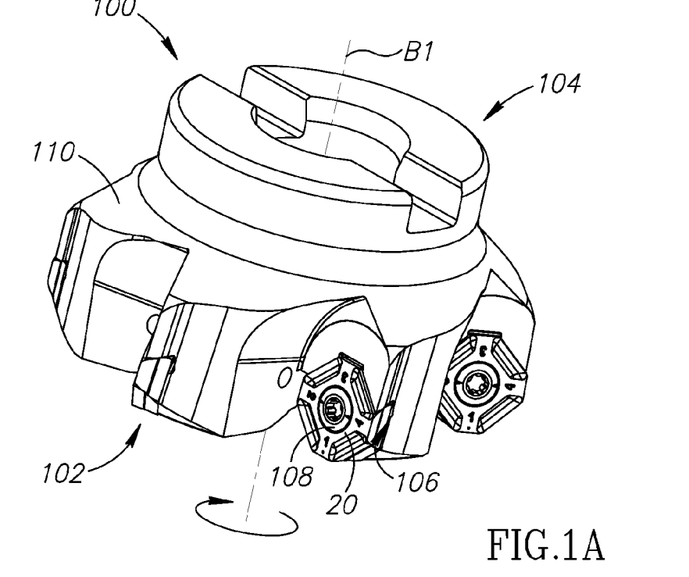
FIG. 1A is a perspective view of a cutting tool in accordance with some embodiments of the present invention.

Reference is first made to FIG. 1A depicting a cutting tool 100 in accordance with some embodiments of the present invention. Cutting tool 100 includes a tool body 110. Cutting tool 100 has a longitudinal axis of rotation B1, a front end 102, and a rear end 104. Tool body 110 includes a plurality of cutting inserts 20, 130 mounted therein. Each of the cutting inserts 20, 130 is seated within a respective insert pocket 106 and retained by a respective clamping bolt 108.

Reference is now made to FIGS. 2A-2D, depicting cutting insert 20 in accordance with a first embodiment of the present invention, including a first polygonal shaped end surface 22 and an opposing second polygonal shaped end surface 24, identical and generally parallel to first end surface 22. First end surface 22 defines a first end plane P1 and second end surface 24 defines a second end plane P2, the first and second end planes P1, P2 being parallel to one another. The first end plane P1 may correspond to a flat surface resting on the first end surface 22 while the second end plane P2 may correspond to a flat surface on which the second end surface 24 rests. Thus, the first end plane P1 is generally parallel to the first end surface 22 and a plurality of cutting edges (discussed below) formed at a periphery of the first end surface 22 may, in some embodiments all either lay on first end plane P1 or have some other common positional relationship with respect to first end plane P1. Second end plane P2 has a similar relationship with the second end surface 24.

Cutting insert 20 exhibits a rotational symmetry about an insert axis B2. Second end surface 24 is rotated about insert axis B2, relative to first end surface 22. First end surface 22 and second end surface 24 both have a polygonal shape of an uneven octagon, such that second end surface 24 is rotated relative to first end surface 22, by an angle of 45°. Since the two end surfaces 22, 24 are identical, however rotated relative to each other, only one of them will be described in detail.

Cutting insert 20 further includes a peripheral side surface 26 extending between the opposing end surfaces 22, 24. Peripheral side surface 26 includes a plurality of peripheral side portions 30, 32 circumferentially arranged in alternating orientation. Each of the first orientation peripheral side portions 30 is an inverse copy (i.e., upside-down copy) of its adjacent second orientation peripheral side portion 32.

Figure 2A:
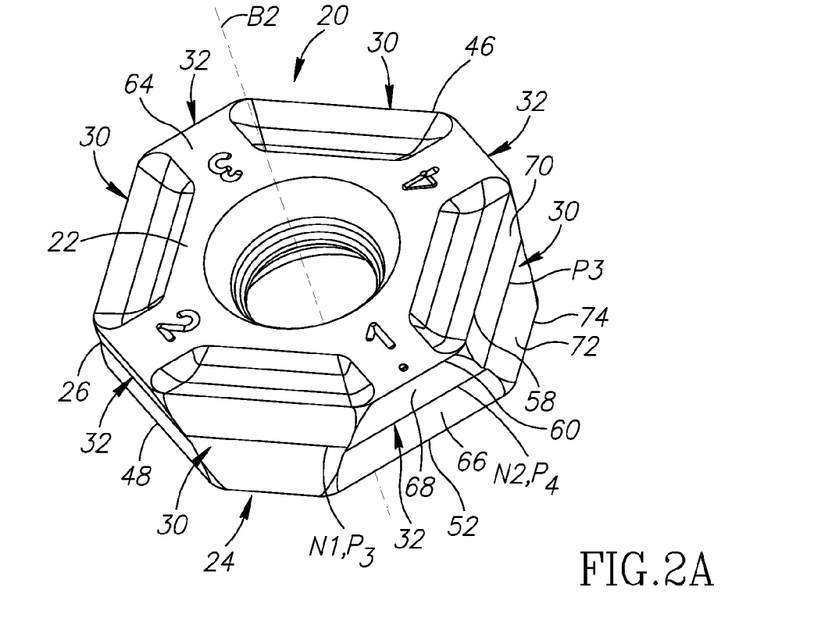
FIG. 2A is a perspective view of a cutting insert in accordance with a first embodiment of the present invention.

The intersection of first end surface 22 with peripheral side surface 26 forms a first continuous circumferential cutting edge 46. The intersection of second end surface 24 with peripheral surface 26 forms a second continuous circumferential cutting edge 48. First circumferential cutting edge 46 is formed along the entire intersection of first end surface 22 with peripheral side surface 26. First circumferential cutting edge 46 includes four identical cutting edge sections 50. Each cutting edge section 50 extends between two vertexes of the polygonal shape of first end surface 22. Each cutting edge section 50 includes a first cutting edge 58 and a second cutting edge 60. Each one of peripheral side portions 30 and 32 extends between one of the first cutting edges on either one of end surfaces 22, 24, and one of the second cutting edges on the other end surface. As shown in FIG. 2A, each first peripheral side portion 30 extends between one of the first cutting edges 58 located on first end surface 22, and one of the second cutting edges 74 located on second end surface 24. Each one of peripheral side portions 32 extends between one of the first cutting edges 52 located on second end surface 24, and one of second cutting edges 60 located on first end surface 22.

Figure 2B:
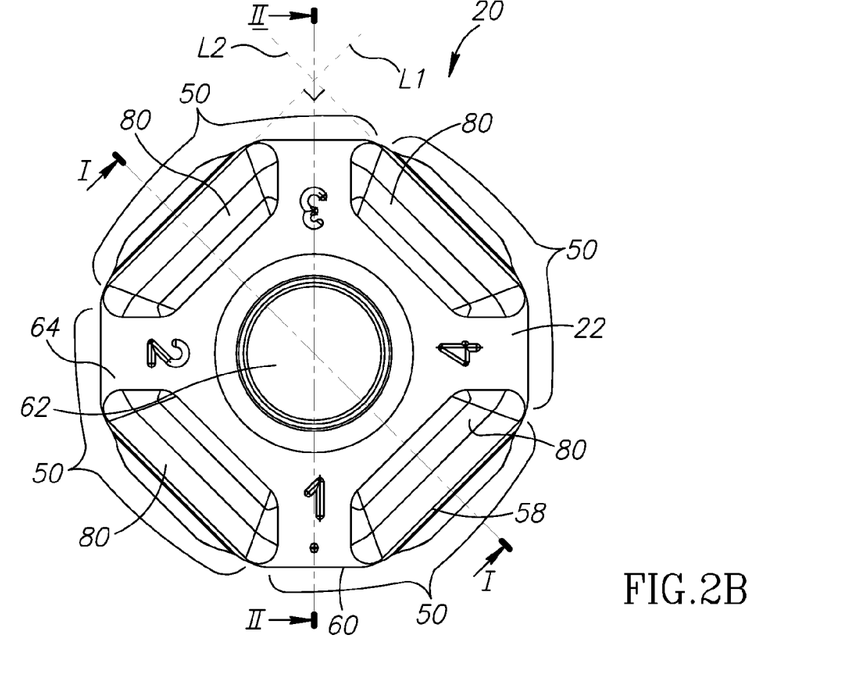
FIG. 2B is a top view of the cutting insert shown in FIG. 2A.

Since the polygonal shape of each one of two end surfaces 22, 24 is an uneven octagon, each end surface 22, 24 has four long sides and four short sides, arranged alternately along their respective circumferential cutting edge 46, 48. In each cutting edge section 50, first cutting edge 58 is located on one of the long sides of the uneven octagon, while second cutting edge 60 is located on one of the short sides of the uneven octagon. Each first cutting edge 58 has a first length A, and each second cutting edge 60 has a second length W. Thus, the first length A of each first cutting edge 58 is preferably greater than the second length W of each second cutting edge 60. According to a specific embodiment of the present invention, the ratio between the second length W and the first length A (i.e., W/A), is in the range of $1/10 \leq W/A \leq 2/3$. According to a further specific embodiment of the present invention, the ratio W/A=2/3. As shown in FIG. 2B, two imaginary lines L1, L2, containing first cutting edges 58 of two adjacent cutting edge sections 50, form a right angle there between.

The cutting insert 20 also includes a central through bore 62 extending between, and opening out to, both end surfaces 22, 24. First end surface 22 includes an insert abutment surface 64 substantially surrounding the opening of through bore 62, and extending towards each of the second cutting edges 60 of first end surface 22. As each of the peripheral side portions 30, 32 extends between one of the first cutting edges 58, 52, on either one of end surfaces 22, 24, and one of the second cutting edges 60, 74, on the other end surface, an operative first cutting edge 58 is thus supported by a portion of the insert abutment surface 64 on the counter side of the cutting insert 20, thereby providing further strength during metal cutting operations.

The first peripheral side portions 30 alternate in the circumferential direction of the insert with second peripheral side portions 32. As shown in FIG. 2A, each first peripheral side portion 30 includes a first sub-face 70 and a second sub-face 72 intersecting at a line N1, in an intermediate plane P3. First sub-face 70 and second sub-face 72 are located on non-coplanar surfaces. Each peripheral side portion 32 includes a first sub-face 66 and a second sub-face 68 intersecting at a line N2, in an intermediate plane P4. First sub-face 66 and second sub-face 68 are also located on non-coplanar surfaces. Thus, the two sub-faces belonging to each of the first peripheral side portions 30 intersect at lines N1 which together define the first intermediate plane P3, while the two sub-faces belonging each of the second peripheral side portions 32 intersect at lines N2 which together define the second plane P4.

Figure 2C:
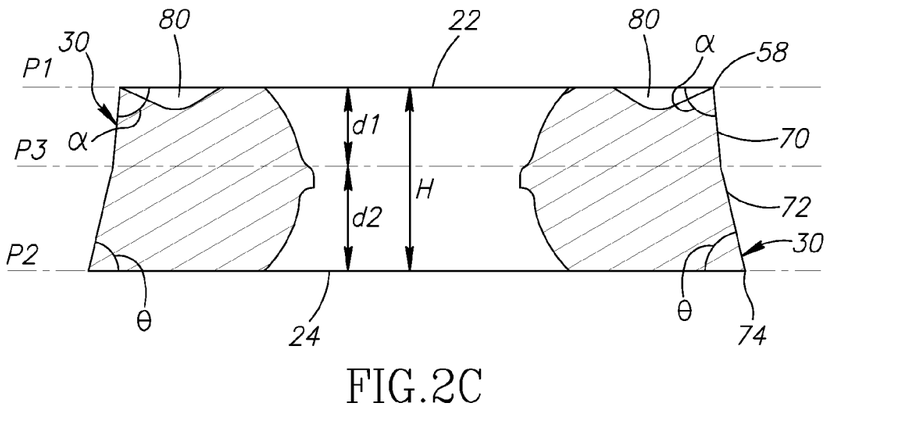
FIG. 2C is a cross-sectional view of the cutting insert shown in FIG. 2B taken along the line I-I.
Figure 2D:
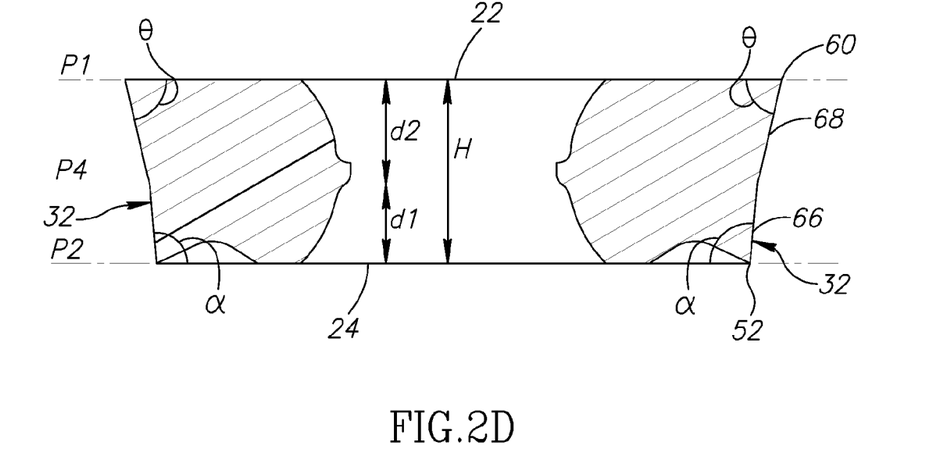
FIG. 2D is a cross-sectional view of the cutting insert shown in FIG. 2B taken along the line II-II.

As shown in FIGS. 2C and 2D, each of the intermediate planes P3 and P4 is located between, and is parallel to, end surfaces 22 and 24. Intermediate planes P3, P4 are parallel to and spaced apart from one another, whereby a first distance d1 between intermediate planes P3, P4 and first and second end surfaces 22, 24, respectively, is smaller than half the thickness distance H between end surfaces 22 and 24 (i.e., H being thickness of cutting insert 20).

The sub-faces 70, 72 of each of the first peripheral side portions 30 intersect at the first line N1 which is a first distance d1 from the first end plane P1 and a second distance d2 from the second end plane P2, while the sub-faces 70, 72 of each of the second peripheral side portions 32 intersect at the second line N2 which is a first distance d1 from the second end plane P2 and a second distance d2 from the first end plane P2. Thus, as seen in FIGS. 2C and 2D, each plane P3, P4 is a first distance d1 from one of end surface and a complementary second distance d2 from the other end surface.

Each of the first sub-faces extends between a respective one of the first cutting edges and one of the intermediate planes, forming a first insert internal angle $\alpha$ with an end plane. As shown in FIG. 2C, first sub-face 70 forms a first insert internal angle $\alpha$ with a first end plane P1. Similarly, as shown in FIG. 2D, first sub-face 66 forms a first insert internal angle $\alpha$ with second end plane P2.

It should be appreciated that use of the terms "internal angle" and "external angle" throughout the description and claims refer to an angle between two planar surface components, as measured internal and external to the member on which the surface components are formed, respectively.

Each of the second sub-faces extends between a respective one of the second cutting edges and one of the intermediate planes, forming a second insert internal angle $\theta$ with an end plane. As shown in FIG. 2C, second sub-face 72 forms a second insert internal angle $\theta$ with the second end plane P2. Similarly, as shown in FIG. 2D, second sub-face 68 forms second insert internal angle $\theta$ with first end plane P1.

According to the present invention, the second insert internal angle $\theta$ is an acute angle, and different from the first insert internal angle $\alpha$. As the first sub-face and second sub-face of the same peripheral side portion are located on non-coplanar surfaces and end planes P1 and P2 are parallel to each other, the sum of the first insert internal angle $\alpha$ and the second insert internal angle $\theta$ is different than 180° (i.e. $\alpha + \theta \neq 180°$). According to a specific embodiment of the present invention, first insert internal angle $\alpha$ is in the range of 85° to 100°, and second insert internal angle $\theta$ is in the range of 65° to 83°. According to a specific embodiment of the present invention, first insert internal angle $\alpha$ is a 95° angle, and the second insert internal angle $\theta$ is a 77° angle.

These typical values of first insert internal angle $\alpha$ and second insert internal angle $\theta$ of cutting insert 20 allow for positioning of cutting insert 20 in a positive axial rake angle, relative to the work piece surface during operation. The axial rake angle is measured between a plane of an end surface of the cutting insert, and a plane perpendicular to surface of the bottom end of the tool body and including therein the lowest cutting edge of the cutting insert. Further, these geometrical characteristics of cutting insert 20 allow for positioning of cutting insert 20 in a negative radial rake angle, during operation on a work piece. The radial rake angle is measured between a radius of the rotating cutting tool and the lowest cutting edge of the cutting insert. Such positioning of the cutting insert may be considered as a positive-negative insert geometry, which introduces significant advantages for an operating cutting tool, such as reducing the required power for operating the cutting tool, better chip removal, and the like.

First end surface 22 includes a plurality of rake depressions 80, each rake depression having an elongated shape and is located substantially along a respective first cutting edge, extending inwardly from the respective first cutting edge. As shown in FIGS. 2B and 2C, each rake depression 80 is located along first cutting edge 58, and extends inwardly from first cutting edge 58. When cutting insert 20 is employed in metal cutting, first cutting edge 58 contacts the surface of a work piece to remove material therefrom. The removed material, in the form of metal chips, flows along rake depression 80, and may then be removed from the cutting area.

It should be noted, that cutting insert 20 is an indexable and reversible cutting insert, such that any of the cutting edge sections 50 on the first end surface 22, as well as the cutting edge sections located on second end surface 24, may be equally employed in metal cutting. Once a certain cutting edge portion of the cutting insert is worn out, the cutting insert is rotated or turned over (either by an operator or automatically), in order to employ a new cutting edge portion.

It should further be noted, that the numeral signs "1"-"4", which appear on first end surface 22 in FIGS. 2A and 2B are index numerals, to indicate to an operator of cutting insert 20, which cutting edge section is being used. Additional numeral signs "5"-"8" appear in similar locations on end surface 24. By following the numerals on end surfaces 22 and 24, the operator of cutting insert 20 may confirm which one of the eight cutting edge sections is being used in each operation.

Although the presently described cutting insert includes end surfaces shaped as uneven octagons, such that each circumferential cutting edge includes four first cutting edges and four second cutting edges, it should be appreciated that the end surface may have any other polygonal shape, such that each circumferential cutting edge would include N cutting edge sections, that is, N first cutting edges and N second cutting edges, wherein N is a positive integer, and N>2. Such a cutting insert would also include 2N peripheral side portions.

Figure 3A:
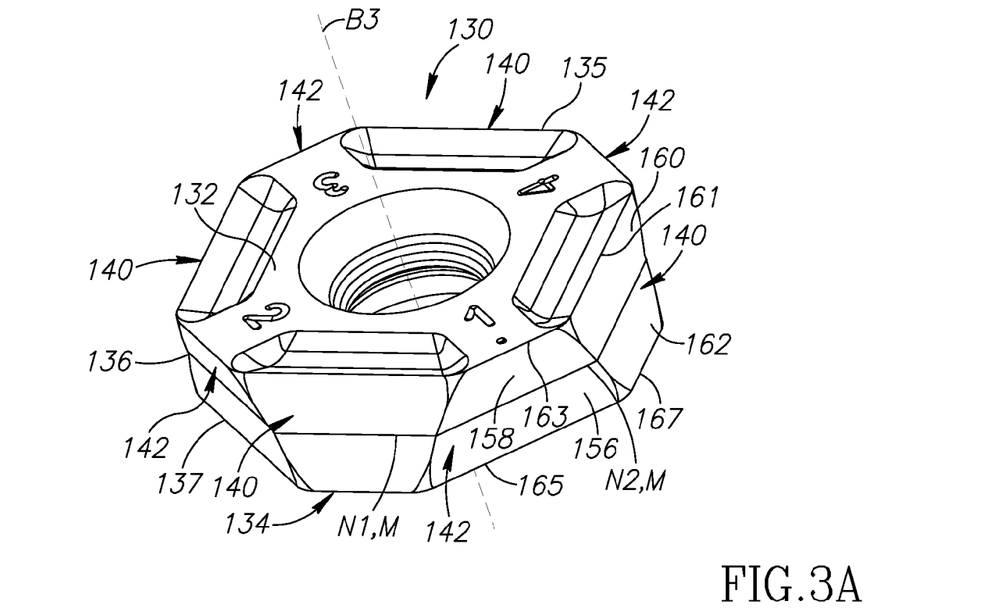
FIG. 3A is a perspective view of a cutting insert in accordance with a second embodiment of the present invention.
Figure 3B:
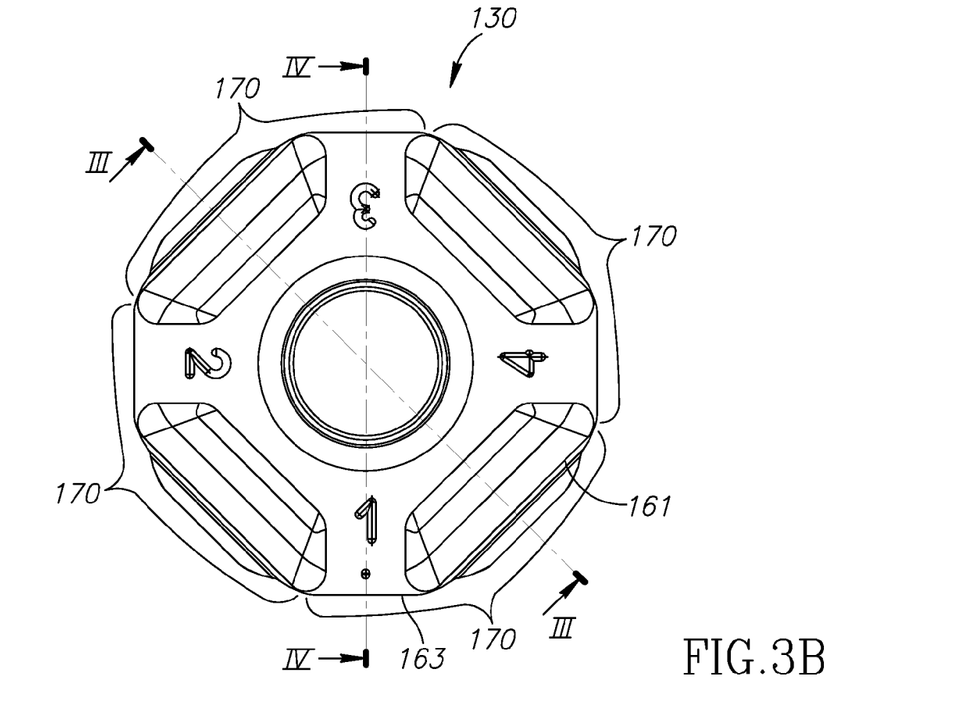
FIG. 3B is a top view of the cutting insert shown in FIG. 3A.
Figure 3C:
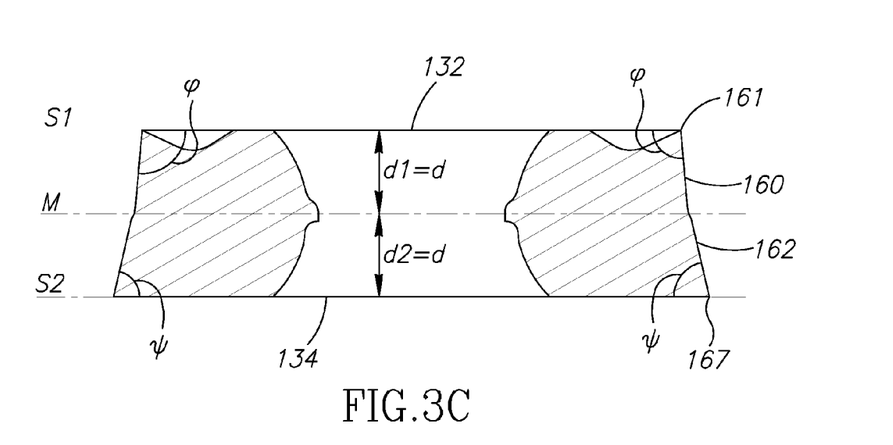
FIG. 3C is a cross-sectional view of the cutting insert shown in FIG. 3B taken along the line III-III.
Figure 3D:
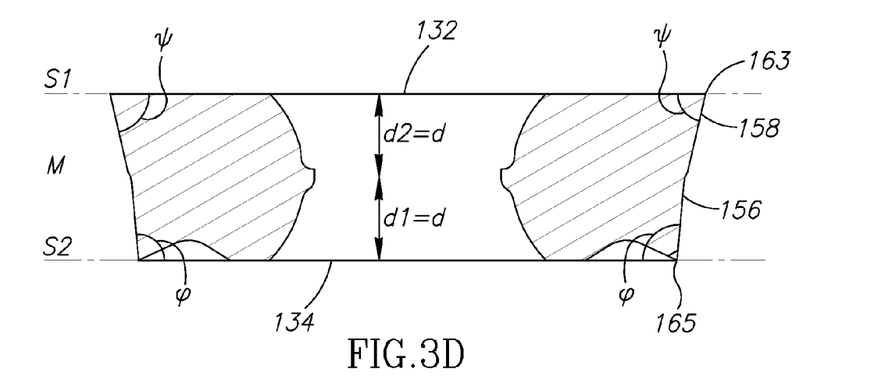
FIG. 3D is a cross-sectional view of the cutting insert shown in FIG. 3B taken along the line IV-IV.

Reference is now made to FIGS. 3A-3D, depicting a cutting insert 130, according to another embodiment of the disclosed technique. Cutting insert 130 includes a first polygonal shaped end surface 132 and an opposing second polygonal shaped end surface 134, identical and parallel to first end surface 132. Cutting insert 130 exhibits a rotational symmetry about an insert axis B3. Second end surface 134 is rotated about insert axis B3, relative to first end surface 132. First end surface 132 and second end surface 134 both have a polygonal shape of an uneven octagon, such that second end surface 134 is rotated relative to first end surface 132, by an angle of 45°. Cutting insert 130 has a median plane M, located between end surfaces 132 and 134, and is parallel to end surfaces 132 and 134. As seen in FIGS. 3C and 3D, the distances d1 and d2 from median plane M to the two end planes S1 and S2 have a common distance d, and so median plane M is equally distant from each of end surfaces 132 and 134.

Cutting insert 130 further includes a peripheral side surface 136 extending between end surfaces 132 and 134. Peripheral side surface 136 includes a plurality of peripheral side portions 140 and 142, circumferentially arranged in alternating orientation. Each of the first orientation peripheral side portions 140 is an inverse copy (i.e., upside-down copy) of its adjacent second orientation peripheral side portion 142.

The intersection of first end surface 132 with peripheral side surface 136 forms a first continuous circumferential cutting edge 135. The intersection of second end surface 134 with peripheral side surface 136 forms a second continuous circumferential cutting edge 137. First circumferential cutting edge 135 includes four identical cutting edge sections 170. Each cutting edge section 170 extends between two vertexes of the polygonal shape of first end surface 132. Each cutting edge section 170 includes a first cutting edge 161 and a second cutting edge 163.

Each one of peripheral side portions 140 and 142 extends between one of the first cutting edges on either one of end surfaces 132, 134, and one of the second cutting edges on the other end surface. As shown in FIG. 3A, each peripheral side portion 140 extends between one of the first cutting edges 161 located on first end surface 132, and one of the second cutting edges 167 located on second end surface 134. Each one of peripheral side portions 142 extends between one of the first cutting edges 165 located on second end surface 134, and one of the second cutting edge 163 located on first end surface 132. Each peripheral side portion 142 includes a first sub-face 156 and a second sub-face 158, and each peripheral side portion 140 includes a first sub-face 160 and a second sub-face 162. First sub-face 156 and second sub-face 158 are located on non-coplanar surfaces, and first sub-face 160 and second sub-face 162 are located on non-coplanar surfaces.

Cutting insert 130 is substantially similar to cutting insert 20, discussed herein above, with the exception that the sub-faces of the peripheral side portions intersect in a single median plane M. Each of the first sub-faces of peripheral side surface 136 extends between one of the first cutting edges and median plane M, forming a first insert internal angle $\phi$ with an end plane. As shown in FIG. 3C, first sub-face 160 forms a first insert internal angle $\phi$ with first end plane S1 that is defined by first end surface 132. Similarly, as shown in FIG. 3D, first sub-face 156 forms a first insert internal angle $\phi$ with second end plane S2 that is defined by second end surface 134.

Each one of the second sub-faces of peripheral side surface 136 extends between one of the second cutting edges and median plane M, forming a second insert internal angle $\psi$ with an end plane. As shown in FIG. 3C, second sub-face 162 forms a second insert internal angle $\psi$ with second end plane S2. Similarly, as shown in FIG. 3D, second sub-face 158 forms a second insert internal angle $\psi$ with first reference plane S1.

Figure 1B:
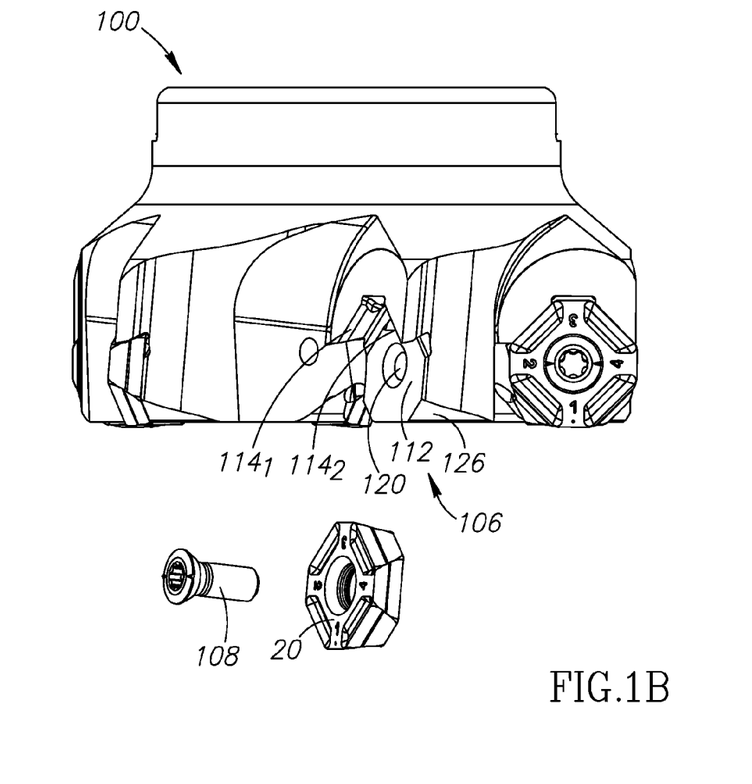
FIG. 1B is a exploded side view of the cutting tool shown in FIG. 1A, revealing an insert pocket.
Figure 1C:
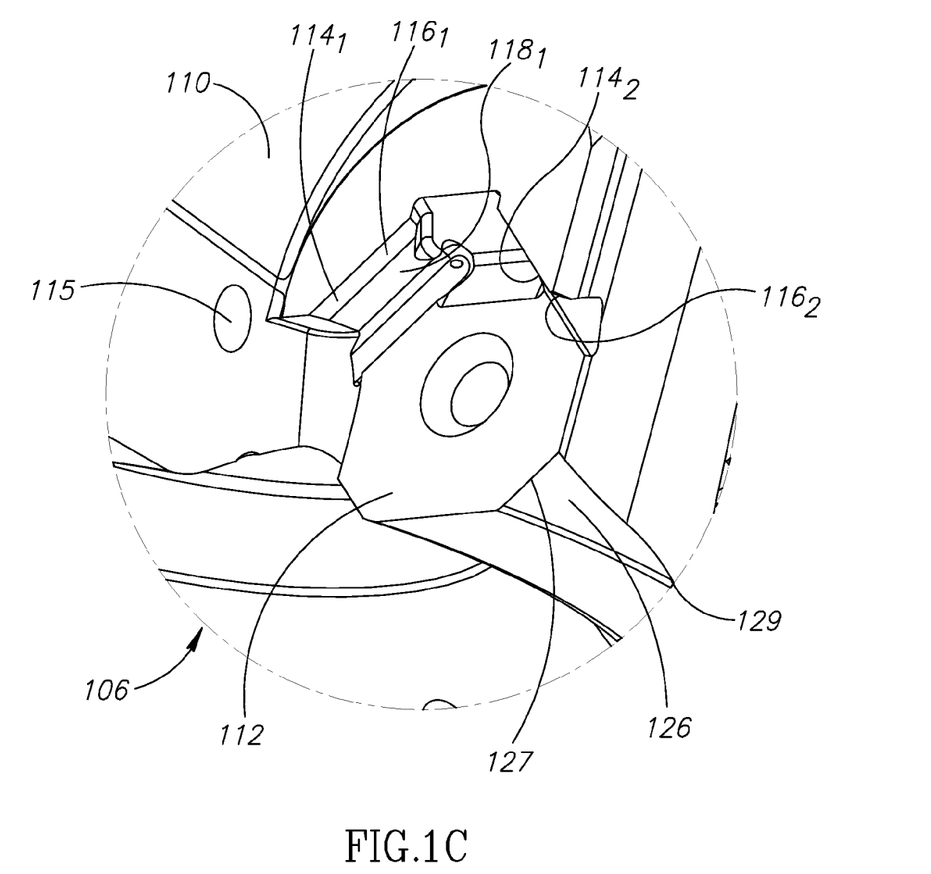
FIG. 1C is a perspective view of the insert pocket shown in FIG. 1B.

With further reference to FIGS. 1A-1E, tool body 110 includes a plurality of cutting inserts 20 mounted therein, wherein each cutting insert is seated within a respective insert pocket 106 and retained by a respective clamping bolt 108. As best shown in FIGS. 1B and 1C, insert pocket 106 includes a preferably planar pocket abutment surface 112 which defines an abutment plane P5, a threaded bore 120, a first and second pocket receiving sidewalls $114_1$ and $114_2$, and a pocket clearance surface 126.

Threaded bore 120 opens out to pocket abutment surface 112. Pocket receiving sidewalls $114_1$, $114_2$ extend from pocket abutment surface 112 in a general tangential direction of tool body 110. Since the two pocket receiving sidewalls $114_1$, $114_2$ are identical (however angled relative to each other), only one of them will be described in detail. Pocket clearance surface 126 includes a first end 127 coupled with pocket abutment surface 112, and a second end 129. Pocket clearance surface 126 extends from pocket abutment surface 112 along bottom end 102 (FIG. 1A) of tool body 110, narrowing down in a rearward direction (i.e., away from the seat of cutting insert 20), towards second end 129. Pocket clearance surface 126 provides a clearance for operative cutting edge 58, when cutting insert 20 is operative against a work piece.

Tool body 110 may optionally include a coolant channel 115, opening out adjacent to insert pocket 106, for providing coolant fluid toward operative cutting edge 58 of cutting insert 20, during operation against a work piece. Such coolant fluid may be required or desirable in order to reduce heat generated in the contact area of the cutting edge and the work piece during metal cutting operation.

First pocket receiving sidewall $114_1$ further includes a first planar sidewall section $116_1$. As best shown in FIG. 1E, first planar sidewall section $116_1$ forms an insert receiving external angle $\beta$ with a plane P6, which intersects first planar sidewall section $116_1$, and is parallel to abutment plane P5. First pocket receiving sidewall $114_1$ further includes a second planar sidewall section $118_1$, intersecting with first planar sidewall section $116_1$. Second planar sidewall section $118_1$ extends towards abutment plane P5, to form an acute pocket external angle $\phi$ with abutment plane P5. Second pocket receiving sidewall $114_2$ similarly includes first and second planar sidewall sections $116_2$, $118_2$.

Figure 1D:
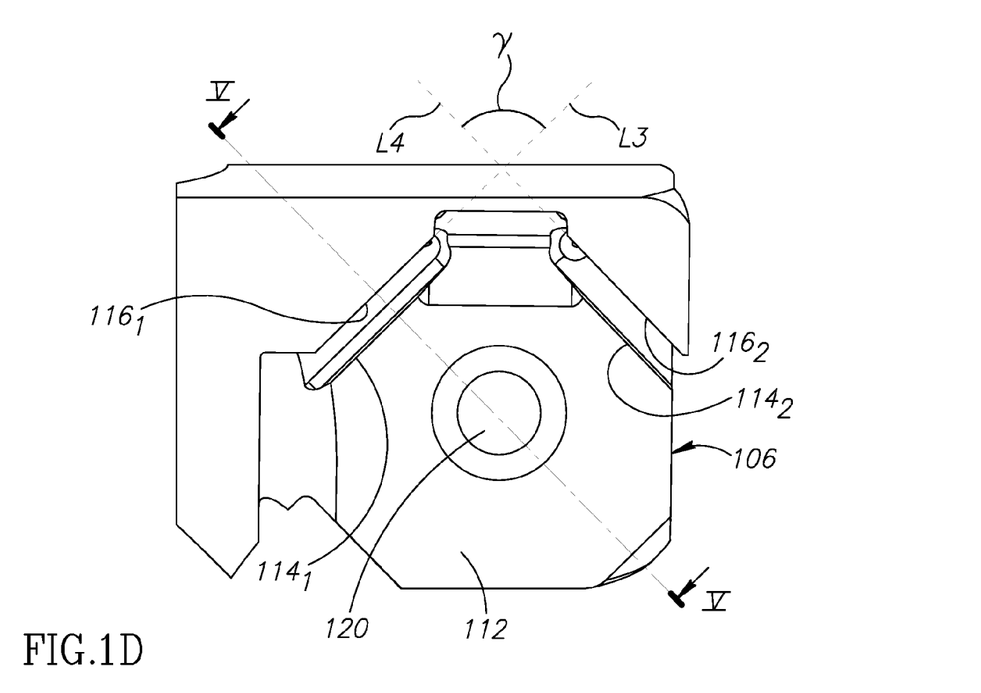
FIG. 1D is a front view of the insert pocket shown in FIG. 1B.
Figure 1E:
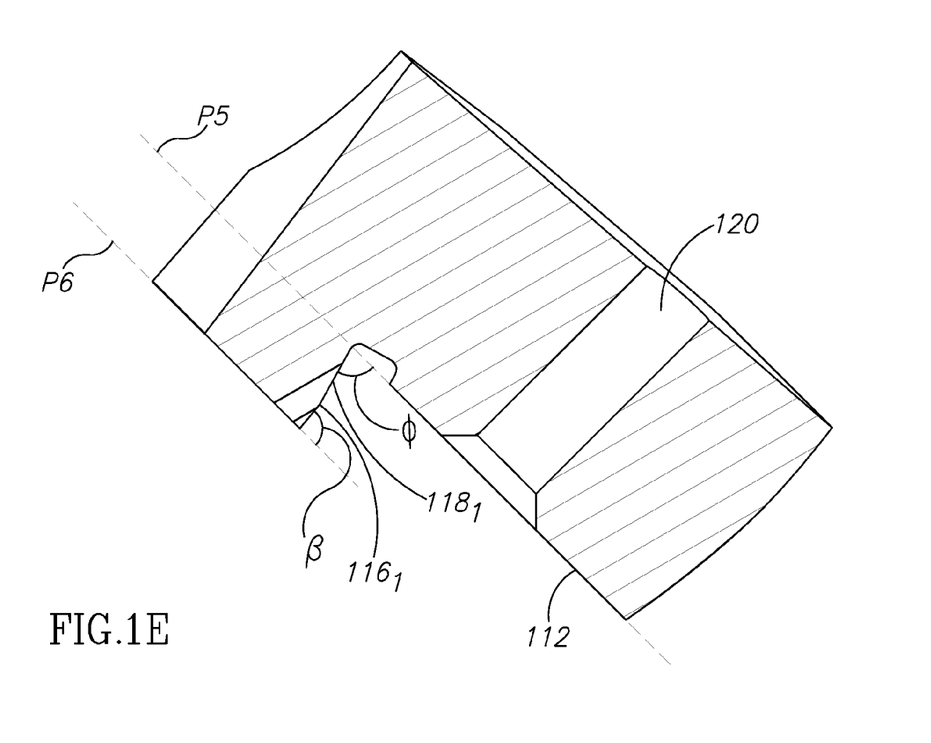
FIG. 1E is a cross-sectional view of the insert pocket shown in FIG. 1D taken along the line V-V.

As best shown in FIG. 1D, in a front view of insert pocket 106, each of the two respective pocket receiving sidewalls $114_1$, $114_2$ contains an imaginary line L3, L4, respectively. Imaginary lines L3, L4 form a substantially right angle $\gamma$ therebetween, and thus pocket receiving sidewalls $114_1$, $114_2$ themselves can be considered to form a right angle $\gamma$ therebetween. The angle $\gamma$ substantially conforms to the right angle formed between the two imaginary lines L1 and L2 (shown in FIG. 2B) containing first cutting edges 58 of two adjacent cutting edge sections 50. It should be noted, that the angle $\gamma$ between the imaginary lines L3 and L4 may be slightly smaller than a right angle (e.g., $\gamma=89.5°$), in order to reduce the surface of contact between the first sidewall sections of the pocket, and the respective first sub-face of the cutting insert, when the cutting insert is seated within the pocket.

Cutting insert 20 is seated within insert pocket 106, such that the abutment surface of second end surface 24 abuts against pocket abutment surface 112. Further, each one of the first sub-faces of two first peripheral side portions 30 (FIG. 2A), abuts against a respective one of first sidewall sections $116_1$ and $116_2$ each of which serves as an abutment surface. In this manner, two of the first peripheral side portions 30 are clamped with respect to receiving sidewalls $114_1$ and $114_2$, in a dovetail manner, due to their correspondingly conforming shape. Additionally, clamping bolt 108 passes through central through bore 62 of cutting insert 20 and threadingly engages threaded bore 120 of pocket 106, in order to secure cutting insert 20 in place for operation.

Acute pocket external angle $\phi$ is slightly less than second insert internal angle $\theta$, in order to avoid contact between the second sidewall section $118_1$, $118_2$ of the pocket, and the respective second sub-face of the peripheral side portion of the insert. Insert receiving external angle $\beta$ is slightly greater than first insert internal angle $\alpha$, in order to reduce the surface of contact between the first sidewall section $116_1$, $116_2$ of the pocket, and the respective first sub-face of the cutting insert. Thus, while the first sidewall sections $116_1$, $116_2$ comprise abutment surfaces, the second sidewall sections $118_1$, $118_2$ comprise non-abutment surfaces. In a specific embodiment of the invention, insert receiving external angle $\beta$ is greater than second insert internal angle $\alpha$ by 0.5°. It should further be noted, that the shape of each one of receiving sidewalls $114_1$ and $114_2$ substantially conforms to the shape of the respective first peripheral side portion 30.

Although the present invention has been described to a certain degree of particularity, it should be understood that various alterations and modifications could be made without departing from the spirit or scope of the invention as hereinafter claimed.

What is claimed is:

1. An indexable reversible cutting insert (20, 130), comprising:
a first polygonal shaped end surface (22, 132) having a number N vertexes and a second polygonal shaped end surface (24, 134), identical and parallel to the first end surface (22, 132), the second end surface (24, 134) being rotationally offset relative to the first end surface (22, 132);
a peripheral side surface (26, 136) extending circumferentially between the end surfaces (22, 24, 132, 134), the peripheral side surface (26, 136) including a plurality of peripheral side portions (30, 32, 140, 142);
two continuous circumferential cutting edges (46, 48, 135, 137), each circumferential cutting edge (46, 48, 135, 137) formed along the entire intersection of each end surface (22, 24, 132, 134) with the peripheral side surface (26, 136), each circumferential cutting edge (46, 48, 135, 137) including a plurality of identical cutting edge sections (50, 170), each cutting edge section (50, 170) extending between two vertexes of the polygonal shape of the respective end surface (22, 24, 132, 134), each cutting edge section (50, 170) including a first cutting edge (52, 58, 161, 165) and a second cutting edge (60, 74, 163, 167);
a central through bore (62) extending between, and opening out to the end surfaces (22, 24, 132, 134); and
two insert abutment surfaces (64), each insert abutment surface (64) located on a respective end surface (22, 24, 132, 134), wherein:
the cutting insert has a maximum of N/2-way indexability on each end surface (22, 132);
each of the peripheral side portions (30, 32, 140, 142) includes a first sub-face (66, 70, 156, 160) and a second sub-face (68, 72, 158, 162) non-coplanar to the first sub-face (66, 70, 156, 160), the first and second sub-faces define at least one intermediate plane (M, P3, P4) located between the end surfaces (22, 24, 132, 134) and parallel to the end surfaces (22, 24, 132, 134), the first and second sub-faces intersecting in one of the at least one intermediate plane (M, P3, P4), and
wherein in each peripheral side portion (30, 32, 140, 142):
each first sub-face (66, 70, 156, 160) extends between a respective one of the first cutting edges (52, 58, 161, 165) and one of the at least one intermediate plane (M, P3, P4), forming a first insert internal angle ($\alpha$, $\phi$) with an end plane (P1, P2, S1, S2) defined by one of the end surfaces (22, 24, 132, 134),
each second sub-face (68, 72, 158, 162) extends between a respective one of the second cutting edges (60, 74, 163, 167) and one of the at least one intermediate plane (M, P3, P4), forming a second insert internal angle ($\theta$, $\psi$) with another end plane (P1, P2, S1, S2) defined by one of the end surfaces (22, 24, 132, 134), the second insert internal angle (θ, ψ) being an acute angle, and different from the first insert internal angle (α, φ).

2. The cutting insert (20) of claim 1, wherein the sub-faces (66, 68, 70, 72) of adjacent peripheral side portions (30, 32) intersect in different spaced apart intermediate planes (P3, P4), and wherein each of the spaced apart intermediate planes (P3, P4) is distanced by a similar first distance (d1) from its closest end plane (P1, P2).

3. The cutting insert (20) of claim 2, wherein the two end surfaces (22, 24) are distanced by a thickness distance H, and wherein the first distance (d1) is smaller than half the thickness distance H.

4. The cutting insert (130) of claim 1, wherein the sub-faces (156, 158, 160, 162) of each peripheral side portion (140, 142) intersect in a single median plane (M), equidistant from the end planes (S1, S2).

5. The cutting insert (20, 130) of claim 1, wherein each circumferential cutting edge (46, 48, 135, 137) includes N first cutting edges (52, 58, 161, 165) and N second cutting edges (60, 74, 163, 167), N being a positive integer greater than 2.

6. The cutting insert (20, 130) of claim 1, wherein the polygonal shape of each of the end surfaces (22, 24, 132, 134) is an uneven octagonal shape.

7. The cutting insert (20, 130) of claim 1, wherein the first insert internal angle (α, φ) is in the range of 85° to 100°.

8. The cutting insert (20, 130) of claim 1, wherein the first insert internal angle (α, φ) is a 95° angle.

9. The cutting insert (20, 130) of claim 1, wherein the second insert internal angle (θ, ψ) is in the range of 65° to 83°.

10. The cutting insert (20, 130) of claim 1, wherein the second insert internal angle (θ, ψ) is a 77° angle.

11. The cutting insert (20, 130) of claim 1, wherein in each cutting edge section (50, 170), the first cutting edge (52, 58, 161, 165) has a first length A and the second cutting edge (60, 74, 163, 167) has a second length W, and wherein the first length A is larger than the second length W.

12. The cutting insert (20, 130) of claim 11, wherein the first length A and the second length W define a ratio W/A, and wherein the ratio W/A is in the range of 1/10≤W/A≤2/3.

13. The cutting insert (20, 130) of claim 12, wherein: W/A=2/3.

14. The cutting insert (20, 130) of claim 1, wherein in each end surface (22, 24, 132, 134) the insert abutment surface (64) substantially surrounds an opening of the through bore (62) on the respective end surface (22, 24, 132, 134), and extends towards each of the second cutting edges (60, 74, 163, 167) of the respective end surface (22, 24, 132, 134).

15. A cutting tool (100) having a longitudinal axis of rotation (B1), the cutting tool (100) comprising:
a tool body (110) having at least one insert pocket (106) formed in a front end (102) of the tool body (110); and
a cutting insert (20, 130) according to claim 1 retained in said at least one insert pocket (106).

16. The cutting tool (100) of claim 15, wherein:
said at least one insert pocket (106) comprises:
a pocket abutment surface (112) defining an abutment plane (P5);
a threaded bore (120) opening out to the pocket abutment surface (112); and
two pocket receiving sidewalls (114$_1$, 114$_2$) extending from the abutment plane (P5), each of the pocket receiving sidewalls (114$_1$, 114$_2$) including:
a first planar sidewall section (116$_1$, 116$_2$) forming an insert receiving external angle (β) with a plane (P6) intersecting the first planar sidewall section (116$_1$, 116$_2$) and is parallel to the abutment plane (P5); and
a second planar sidewall section (118$_1$, 118$_2$) intersecting with the respective first planar sidewall section (116$_1$, 116$_2$), and extending towards the abutment plane (P5) to form an acute pocket external angle (φ) therewith;
one of the two insert abutment surfaces (64) abuts the pocket abutment surface (112);
the first sub-faces (66, 70, 156, 160) of two peripheral side portions (30, 32, 140, 142) of the cutting insert (20, 130) abut respective ones of the first sidewall sections (116$_1$, 116$_2$), in a dovetail manner; and
a clamping bolt (108) passes through the central through bore (62) of the cutting insert (20, 130) and threadingly engages the threaded bore (120) of the insert pocket (106).

17. The cutting tool (100) of claim 16, wherein the acute pocket external angle (φ) is less than the second insert internal angle (θ, ψ).

18. The cutting tool (100) of claim 16, wherein the insert receiving external angle (β) is greater than the first insert internal angle (α, φ) of the cutting insert (20, 130).

19. The cutting tool (100) of claim 16, wherein the two first sub-faces (66, 70, 156, 160) in abutment with respective ones of the first sidewall sections (116$_1$, 116$_2$), in a dovetail manner, are associated with the same end surface (22, 24, 132, 134) of the cutting insert (20, 130).

20. The cutting tool (100) of claim 16, wherein in a front view of the at least one insert pocket (106), the two respective pocket receiving sidewalls (114$_1$, 114$_2$) form a substantially right angle (γ) therebetween.

21. A cutting tool body (110) having a longitudinal axis of rotation (B1), the cutting tool body (110) having a front end (102) with at least one insert pocket (106) formed therein, wherein:
said at least one insert pocket comprises:
a pocket abutment surface (112) defining an abutment plane (P5);
a threaded bore (120) opening out to the pocket abutment surface (112); and
two pocket receiving sidewalls (114$_1$, 114$_2$) extending from the abutment plane (P5), each of the pocket receiving sidewalls (114$_1$, 114$_2$) including:
a first planar sidewall section (116$_1$, 116$_2$) forming an insert receiving external angle (β) with a plane (P6) intersecting the first planar sidewall section (116$_1$, 116$_2$) and is parallel to the abutment plane (P5); and
a second planar sidewall section (118$_1$, 118$_2$) intersecting with the respective first planar sidewall section (116$_1$, 116$_2$), and extending towards the abutment plane (P5) to form an acute pocket external angle (φ) therewith;
wherein each of the first planar sidewall sections (116$_1$, 116$_2$) comprises an abutment surface; and
wherein in a front view of each insert pocket (106), the two pocket receiving sidewalls (114$_1$, 114$_2$) form a substantially right angle (γ) therebetween.

22. An indexable reversible cutting insert (20, 130) having an insert axis (B2, B3), and comprising:
a polygonal shaped first end surface (22, 132) defining a first end plane (P1, S1) and a polygonal shaped second end surface (24, 134) defining a second end plane (P2, S2), the first and second end planes being parallel to one another;

a peripheral side surface (26, 136) extending between the end surfaces (22, 24, 132, 134), the peripheral side surface (26, 136) including first peripheral side portions (30, 140) alternated in the circumferential direction with second peripheral side portions (32, 142);

a first edge formed along the intersection of the first end surface (22, 132) with the peripheral side surface (26, 136), the first edge comprising a plurality of first cutting edges (58, 161) alternated with a plurality of second cutting edges (60, 163);

a second edge formed along the intersection of the second end surface (24, 134) with the peripheral side surface (26, 136), the second edge comprising a plurality of first cutting edges (52, 165) alternated with a plurality of second cutting edges (74, 167);

wherein:

each of the first peripheral side portions (30, 140) comprises a first sub-face (70, 160) which forms a first insert internal angle (α, φ) with the first end plane (P1, S1) and a second sub-face (72, 162) which forms a second insert internal angle (θ, ψ) with the second end plane (P2, S2), the first sub-face and the second sub-face of each first peripheral side portion (30, 140) intersecting at a first line (N1) which is a first distance (d1, d) from the first end plane (P1, S1) and a second distance (d2, d) from the second end plane (P2, S2);

each of the second peripheral side portions (32, 142) comprises a first sub-face (66, 156) which forms a first insert internal angle (α, φ) with the second end plane (P2, S2) and a second sub-face (68, 158) which forms a second insert internal angle (θ, ψ) with the first end plane (P1, S1), the first sub-face and the second sub-face of each second peripheral side portion (32, 142) intersecting at a second line (N2) which is a first distance (d1, d) from the second end plane (P2, S2) and a second distance (d2, d) from the first end plane (P1, S1);

the first cutting edges (52, 58, 161, 165) each have a first length A and the second cutting edges (60, 74, 163, 167) each have a second length W, the first length A being larger than the second length W; and a sum of the first insert internal angle (α, φ) and the second insert internal angle (θ, ψ) is not equal to 180°.

23. The indexable reversible cutting insert (20, 130) of claim 22, further comprising:

a central through bore (62) extending between, and opening out to, the end surfaces (22, 24, 132, 134);

an insert abutment surface (64) formed on each end surface (22, 24, 132, 134);

wherein:

the second end surface (24, 134) is rotationally offset relative to the first end surface (22, 132);

each of the first peripheral side portions (30, 140) extends from a first cutting edge (58, 161) associated with the first end surface (22, 132) to a second cutting edge (74, 167) associated with the second end surface (24, 134); and each of the second peripheral side portions (32, 142) extends from a first cutting edge (52, 165) associated with the second end surface (24, 134) to a second cutting edge (60, 163) associated with the first end surface (22, 132).

24. The indexable reversible cutting insert (20) of claim 22, wherein:

the first distance (d1) and the second distance (d2) are different from one another.

25. The indexable reversible cutting insert (130) of claim 22, wherein:

the first distance (d1) and the second distance (d2) are identical to one another.

26. An indexable reversible cutting insert (20, 130) having an insert axis (B2, B3), and comprising:

a polygonal shaped first end surface (22, 132) having an even number N vertexes and defining a first end plane (P1, S1), and a polygonal shaped second end surface (24, 134) defining a second end plane (P2, S2), the first and second end planes being parallel to one another;

a peripheral side surface (26, 136) extending between the end surfaces (22, 24, 132, 134), the peripheral side surface (26, 136) including first peripheral side portions (30, 140) alternated in the circumferential direction with second peripheral side portions (32, 142), the second peripheral side portions (32, 142) being an inverse copy of the first peripheral side portions (30, 140);

wherein:

the cutting insert has a maximum of N/2-way indexability on each end surface (22, 132);

each of the first peripheral side portions (30, 140) comprises a first sub-face (70, 160) which forms a first insert internal angle (α, φ) with the first end plane (P1, S1) and a second sub-face (72, 162) which forms a second insert internal angle (θ, ψ) with the second end plane (P2, S2);

each of the second peripheral side portions (32, 142) comprises a first sub-face (66, 156) which forms a first insert internal angle (α, φ) with the second end plane (P2, S2) and a second sub-face (68, 158) which forms a second insert internal angle (θ, ψ) with the first end plane (P1, S1); and a sum of the first insert internal angle (α, φ) and the second insert internal angle (θ, ψ) is not equal to 180°.

27. The indexable reversible cutting insert (20, 130) of claim 26, wherein:

in each peripheral side portion (30, 32, 140, 142), the first sub-face (66, 70, 156, 160) intersects the second sub-face (68, 72, 158, 162) at a line (N1, N2) which is parallel to the first and second end planes (P1, P2).

28. The indexable reversible cutting insert (20, 130) of claim 27, wherein:

in the first peripheral side portions (30, 140), the first sub-faces (70, 160) intersect the second sub-faces (72, 162) at a first distance (d1, d) from the first end plane (P1) and a second distance (d2, d) from the second end plane (P2);

in the second peripheral side portions (32, 142), the first sub-faces (66, 156) intersect the second sub-faces (68, 158) at a first distance (d1, d) from the second end plane (P1) and a second distance (d2, d) from the first end plane (P1).

29. The indexable reversible cutting insert (20) of claim 28, wherein:

the first distance (d1) and the second distance (d2) are different from one another.

30. The indexable reversible cutting insert (130) of claim 28, wherein:

the first distance (d1) and the second distance (d2) are identical to one another.

31. The indexable reversible cutting insert (20, 130) of claim 26, further comprising:

a first edge (46, 135) formed along the intersection of the first end surface (22, 132) with the peripheral side surface (26, 136), the first edge comprising a plurality of first cutting edges (58, 161) alternated with a plurality of second cutting edges (60, 163);

a second edge (48, 137) formed along the intersection of the second end surface (24, 134) with the peripheral side surface (26, 136), the second edge comprising a plurality of first cutting edges (52, 165) alternated with a plurality of second cutting edges (74, 167).

32. An indexable reversible cutting insert (20, 130), comprising:

a first polygonal shaped end surface (22, 132) and a second polygonal shaped end surface (24, 134), identical and parallel to the first end surface (22, 132), the second end surface (24, 134) being rotationally offset relative to the first end surface (22, 132);

a peripheral side surface (26, 136) extending circumferentially between the end surfaces (22, 24, 132, 134), the peripheral side surface (26, 136) including a plurality of peripheral side portions (30, 32, 140, 142);

two continuous circumferential cutting edges (46, 48, 135, 137), each circumferential cutting edge (46, 48, 135, 137) formed along the entire intersection of each end surface (22, 24, 132, 134) with the peripheral side surface (26, 136), each circumferential cutting edge (46, 48, 135, 137) including a plurality of identical cutting edge sections (50, 170), each cutting edge section (50, 170) extending between two vertexes of the polygonal shape of the respective end surface (22, 24, 132, 134), each cutting edge section (50, 170) including a first cutting edge (52, 58, 161, 165) and a second cutting edge (60, 74, 163, 167);

a central through bore (62) extending between, and opening out to the end surfaces (22, 24, 132, 134); and two insert abutment surfaces (64), each insert abutment surface (64) located on a respective end surface (22, 24, 132, 134), wherein:

each of the peripheral side portions (30, 32, 140, 142) includes a first sub-face (66, 70, 156, 160) and a second sub-face (68, 72, 158, 162) non-coplanar to the first sub-face (66, 70, 156, 160), the first and second sub-faces define at least one intermediate plane (M, P3, P4) located between the end surfaces (22, 24, 132, 134) and parallel to the end surfaces (22, 24, 132, 134), the first and second sub-faces intersecting in one of the at least one intermediate plane (M, P3, P4);

in each peripheral side portion (30, 32, 140, 142):

each first sub-face (66, 70, 156, 160) extends between a respective one of the first cutting edges (52, 58, 161, 165) and one of the at least one intermediate plane (M, P3, P4), forming a first insert internal angle ($\alpha$, $\phi$) with an end plane (P1, P2, S1, S2) defined by one of the end surfaces (22, 24, 132, 134), each second sub-face (68, 72, 158, 162) extends between a respective one of the second cutting edges (60, 74, 163, 167) and one of the at least one intermediate plane (M, P3, P4), forming a second insert internal angle ($\theta$, $\psi$) with another end plane (P1, P2, S1, S2) defined by one of the end surfaces (22, 24, 132, 134), the second insert internal angle ($\theta$, $\psi$) being an acute angle, and different from the first insert internal angle ($\alpha$, $\phi$); and in each cutting edge section (50, 170), the first cutting edge (52, 58, 161, 165) has a first length A and the second cutting edge (60, 74, 163, 167) has a second length W, and wherein the first length A is larger than the second length W.

33. The cutting insert (20, 130) of claim 32, wherein the first length A and the second length W define a ratio W/A, and wherein the ratio W/A is in the range of $1/10 \leq W/A \leq 2/3$.

* * * * *